United States Patent
Gulunay

(10) Patent No.: US 7,739,051 B2
(45) Date of Patent: Jun. 15, 2010

(54) METHOD FOR DETERMINATION OF DIFFRACTOR LOCATIONS AT SEA BOTTOM FOR THE PURPOSE OF ATTENUATING SUCH ENERGY

(75) Inventor: Necati Gulunay, Missouri City, TX (US)

(73) Assignee: Compagnie Generale de Geophysique, Massy Cedex (FR)

( * ) Notice: Subject to any disclaimer, the term of this patent is extended or adjusted under 35 U.S.C. 154(b) by 702 days.

(21) Appl. No.: 10/890,793

(22) Filed: Jul. 14, 2004

(65) Prior Publication Data

US 2006/0015259 A1 Jan. 19, 2006

(51) Int. Cl.
*G01V 1/00* (2006.01)
*G01V 1/38* (2006.01)

(52) U.S. Cl. .................................. 702/14; 367/24
(58) Field of Classification Search ............... 702/14, 702/5, 11, 17, 18, 1, 2; 367/37, 38, 43, 15, 367/24, 21, 47, 73; 166/352, 250.01; 324/323, 324/326; 703/2, 5
See application file for complete search history.

(56) References Cited

U.S. PATENT DOCUMENTS

| | | | | |
|---|---|---|---|---|
| 3,638,176 A * | 1/1972 | White | ................. | 367/40 |
| 4,797,860 A * | 1/1989 | Quaglino | ................. | 367/47 |
| 4,843,597 A * | 6/1989 | Gjessing et al. | ................. | 367/15 |
| 4,992,991 A * | 2/1991 | Young et al. | ................. | 367/20 |
| 5,008,861 A * | 4/1991 | Gallagher | ................. | 367/59 |
| 5,532,976 A * | 7/1996 | Schneider, Jr. | ................. | 367/38 |
| 6,049,507 A * | 4/2000 | Allen | ................. | 367/21 |
| 6,067,275 A * | 5/2000 | Sayers | ................. | 367/75 |
| 6,151,556 A * | 11/2000 | Allen | ................. | 702/18 |
| 6,292,755 B2 * | 9/2001 | Chambers et al. | ................. | 702/17 |
| 6,493,636 B1 * | 12/2002 | DeKok | ................. | 702/17 |
| 6,546,339 B2 * | 4/2003 | Bevc et al. | ................. | 702/18 |
| 6,687,618 B2 * | 2/2004 | Bevc et al. | ................. | 702/14 |
| 6,738,715 B2 * | 5/2004 | Shatilo et al. | ................. | 702/17 |
| 6,763,305 B2 * | 7/2004 | Bernitsas | ................. | 702/14 |
| 6,832,160 B2 * | 12/2004 | Vinje | ................. | 702/14 |
| 6,987,706 B2 * | 1/2006 | Wood | ................. | 367/43 |
| 7,085,195 B2 * | 8/2006 | Taner et al. | ................. | 367/50 |
| 2005/0219949 A1 * | 10/2005 | Taner et al. | ................. | 367/57 |

OTHER PUBLICATIONS

Milkereit et al., Multiattribute Processing of Seismic Data: Application to Dip Displays, Dec. 1990, Canadian Journal of exploration Geophysics, vol. 26, Nos. 1&2, pp. 47-53.*

Keggin et al., Attenuation of Multiple Diffractions by Multi-Azimuth Streamer Acquisition, May 27-30, 2002, EAGE 64th Conference & Exhibition.*

(Continued)

*Primary Examiner*—Michael P. Nghiem
*Assistant Examiner*—Toan M Le
(74) *Attorney, Agent, or Firm*—Strasburger & Price, LLP

(57) ABSTRACT

Coherency analysis, such as semblance scan or stacking amplitude, is used to locate diffractors. This is done utilizing traces of a recorded 3-D marine survey with one or more cables. Locations of each diffractor are determined by comparing the lateral coherency of the received amplitudes that each assumed diffractor position generates. Once the diffractors are located, noise energy originating from the diffractors is minimized.

1 Claim, 4 Drawing Sheets

OTHER PUBLICATIONS

Dragoset et al., Data Enhancement from a 500-Channel Streamer, Jan. 1984, IEEE Journal of Oceanic Engineering, vol. OE-9, No. 1, pp. 40-47.*

Tsai, C. James, An Analysis Leading to the Reduction of Scattered Noise on Deep Marine Seismic Records, Jan. 1984, Geophysics, vol. 49, No. 1, pp. 17-26.*

Bezdan, S., Experimental Seismic Surveys of the Trans-Hudson Orogen, 1998, A Thesis Submitted for the Ph.D. Degree, Department of Geological Sciences, University of Saskatchewan, Saskatoon.*

Ladd et al., Wide-Aperture Seismic Reflection Profiles Across the Barbados Ridge Complex, 1990, Proceedings of the Ocean Drilling Program, Scientific results, vol. 110, pp. 3-6.*

Taner et al., Velocity Spectra-Digital Computer Derivation and Applications of Velocity Functions, Dec. 1969, Geophysics, vol. 34, No. 6, pp. 859-881.*

Key et al., New Approach to Seismic-Reflection Event Detection and Velocity determination, Aug. 1990, Geophysics, vol. 55, No. 8, pp. 1057-1069.*

Gulunay, N., High-Resolution CVS: Generalized Covariance Measure, 1991, 61st Ann. Int. Mtg.: Soc. of Expl., Geophysics, pp. 1264-1267.*

Gonzalez-Serrano et al., Migration Velocity Analysis in 3D, 1984 SEG Annual Meeting, Expanded Abstracts.*

Sicking, C., Diffraction Semblance for velocity and Structure Analysis, 1987 SEG Annual Meeting, expanded Abstracts.*

Verwest et al., Relation Between Velocity Fields and Imaging in the Presence of Lateral velocity variations, 1985 SEG Annual Meeting, Expanded Abstracts.*

Landa et al., A Method for Detection of Diffracted Waves on Common-Offset Sections, 1987, Geophysical Prospecting 35, pp. 359-373.*

Landa et al., Seismic Monitoring of Diffraction Images for detection of Local Heterogeneities, May-Jun. 1998, Geophysics, vol. 63, No. 3, pp. 1093-1100.*

Blonk et al., Inverse Scattering of Surface Waves: A New Look At Surface Consistency, Jun. 1994, Geophysics, vol. 59, No. 6, pp. 963-972.*

Blonk et al., An Elastodynamic Inverse Scattering Method for Removing Scattered Surface Waves from Field Data, Nov.-Dec. 1995, Geophysics, vol. 60, No. 6, pp. 1897-1905.*

Fookes et al., Practical Interference Noise Elimination in Modern Marine Data Processing, 2003 SEG Annual Meeting, Expanded Abstracts, pp. 1905-1908.*

* cited by examiner

METHOD FOR DETERMINATION OF DIFFRACTOR LOCATIONS AT SEA BOTTOM FOR THE PURPOSE OF ATTENUATING SUCH ENERGY

FIELD OF THE INVENTION

The present invention relates to geophysical prospecting using seismic signals, and in particular an automatic method for determining the locations of the shallow inhomogeneities or obstacles (to be called diffractors or scatterers) that scatter back energy radiated from source to the recorded sections in 3-D marine surveys.

BACKGROUND OF THE INVENTION

In the field of geophysical prospecting, seismic signals are used to do 3-D seismic surveys of a predetermined area. However, problems arise in the collection of data due to the backscattering of energy from the shallow inhomogeneities or obstacles.

Prior Art at Compagnie Generale de Geophysique:

Compagnie Generale de Geophysique utilizes a process called Deterministic Diffractor Noise Reduction (DDNR) to remove the contribution of diffractor energy from the survey. DDNR involves identifying and picking travel times for each diffractor located at sea bottom. Once travel times are known for a diffractor, then its location can be calculated by assuming a speed of propagation, like 1500 m/s, for the medium. Data can then be flattened using travel times calculated for the diffractor and the flat component of energy (diffraction) can be attenuated using FK filter or Radon transform filter, as it is known in the art.

Prior Art in the Industry:

Fookes et al. ("Practical interference noise elimination in modern marine data processing," Expanded Abstracts, 2003 SEG Annual Meeting) follow a method similar to Compagnie Generale de Geophysique DDNR method mentioned above: pick travel times and find the diffractor location that minimizes the error between calculated travel times and measured travel times. Upon determination of diffractor location, the data is flattened and flat events suppressed.

A use of coherency measurement is using semblance in stacking velocity analysis of seismic data and is done by Taner and Koehler (1969, "Velocity spectra—digital computer derivation and applications of velocity functions," Geophysics, 34, 859-881). The use of other coherency measures than semblance for lateral coherency of events is also possible: energy normalized cross correlation sum, stacking power, or stacking amplitude are other possibilities. Key and Smithson (1990, "New approach to seismic-reflection event detection and velocity determination": GEOPHYSICS, Soc. of Expl. Geophys., 55, 1057-1069.) derived their coherency measure from the eigenvalues of the problem at hand. Gulunay (1991, "High resolution CVS: Generalized covariance measure", 61st Ann. Internat. Mtg: Soc. of Expl. Geophys., 1264-1267) studied the relationship of such coherency measures including the ones derived from semblance. Gonzalez-Serrano and Chon ("Migration velocity analysis in 3-D," Expanded Abstracts, 1984 SEG Annual Meeting), Sicking ("Diffraction semblance for velocity and structure analysis," Expanded Abstracts, 1987 SEG Annual Meeting), and VarWest et al. ("Relation between velocity fields and imaging in the presence of lateral velocity variations," Expanded Abstracts, 1985 SEG Annual Meeting) use semblance analysis for prestack migration velocity determination. Landa et al. ("A method for detection of diffracted waves on common offset sections," Geophysical Prospecting, 35, 359-373, 1987) use semblance analysis to find buried edges in x-z plane that cause diffraction under a 2-D seismic line (shooting and receiving along x direction, shots and receivers at the surface, z=0) using common offset data (x-t). Landa and Keydar ("Seismic monitoring of diffraction images for detection of local heterogeneities," Geophysics, 63, 3, 1093-1100, May 1998) use semblance analysis to detect local heterogeneities (diffractors) buried under a 2-D section (x-z plane) using a source receiver configuration similar to the ones used in 2-D seismic recordings (shooting and receiving along x-z direction, shots and receivers at the surface, z=0). The paper discusses a "D-section" which is similar in concept to semblance scanning; however, D-section is done for diffractor buried in a vertical plane of a complex earth. U.S. Pat. Nos. 6,687,618 and 6,546,339 also address the use of semblance scan in geophysical processing using seismic signals.

Two papers by Blonk et al (1994, "Inverse scattering of surface waves: A new look at surface consistency", Geophysics, 59, 6, 963-972 and 1995, "An elastodynamic inverse scattering method for removing scattered surface waves from field data", Geophysics, 60, 6, 1897-1903.) address the issue of finding and removing such diffractors for land data but their method is based on "linearized elastodynamic inverse scattering theory" and involves consideration of temporal frequency, solution of linear systems with tools like conjugate gradient algorithm and is completely different from the time domain amplitude coherency approach of the arrival energy used in this invention.

It is an object of this invention to remove the energy from the survey that is contributed by the diffractor.

It is a further object of the present invention to eliminate the task or necessity of picking of arrival or travel-times or going into complex theoretical calculations as in Blonk et al (1994, 1995) papers for determination of diffractor locations.

SUMMARY OF THE INVENTION

Diffraction is a wave phenomenon where a source radiates energy to a medium and an obstacle in the medium scatters that energy back to an array of receivers placed in the same medium. Seismic energy radiated by air guns in a 3-D marine survey travels in water or shallow part of the seismic section and gets scattered by diffractors at the water bottom, contaminating the seismic sections. Materials left at the sea bottom, such as wellheads, shipwrecks, even outcropping geology, may act like diffractors.

The present invention eliminates the task of picking arrival times by judging the likelihood of a tested location to be a diffractor point by calculating coherency of arrivals from that point. The present invention preferably utilizes semblance scan as a coherency analysis tool to minimize the energy contributed to the survey by diffractors. Any of the aforementioned measures could be used for coherency calculation; however, semblance derived measures are the most advantageous. First, they are the most economical to use. For this reason, the present invention uses semblance as the coherency measure. Second, semblance is sensitive to the coherency of the event but not to its actual strength. For example, stack amplitude for a five-sample event with amplitudes (1,1,1,2,1) is 6/5=1.2 and its semblance is 0.9. Stack amplitude for (10, 10,10,20,10) is 60/5=12 but its semblance is still the same and is 0.9. An event could be weak but it could be coherent while an event could be strong but it may not be coherent.

In the present invention, locations of each diffractor are determined by comparing the lateral coherency of the received amplitudes that each assumed diffractor position generates. That is, these are the locations that are in agreement with the travel paths observed on the seismic traces recorded. The amplitudes of the diffractions are picked from received traces at the travel times (or around the travel times) it takes the emitted energy by a source to travel from it to a diffractor and from a diffractor to a receiver. Many measures may be used for lateral (receiver to receiver) coherency, including semblance. Areas of the x-y plane that radiate back scattered energy from sources to receivers in a 3-D marine recording can be put into semblance scan to find out which of these locations are likely to be the diffractor locations (by attaching a semblance value to each point). For a given diffractor, the amplitudes picked to be put into the semblance calculation can come from the traces (source-receiver pairs) of one or many sources and one or many array of receivers (called cables or streamers). This allows points with large semblance to be picked, thereby eliminating the need for picking travel times for each diffractor. Once a diffractor location is known, then data can be flattened using sum of the travel times from source to diffractor and from diffractor to receiver and then applying one of the methods of prior art, such as FK filtering, Radon filtering, etc. to remove such energy contributed by this diffractor.

DESCRIPTIONS OF THE DRAWINGS

For further understanding of the nature and objects of the present invention, reference should be had to the following figures in which like parts are given like reference numerals and wherein.

Figure 5:
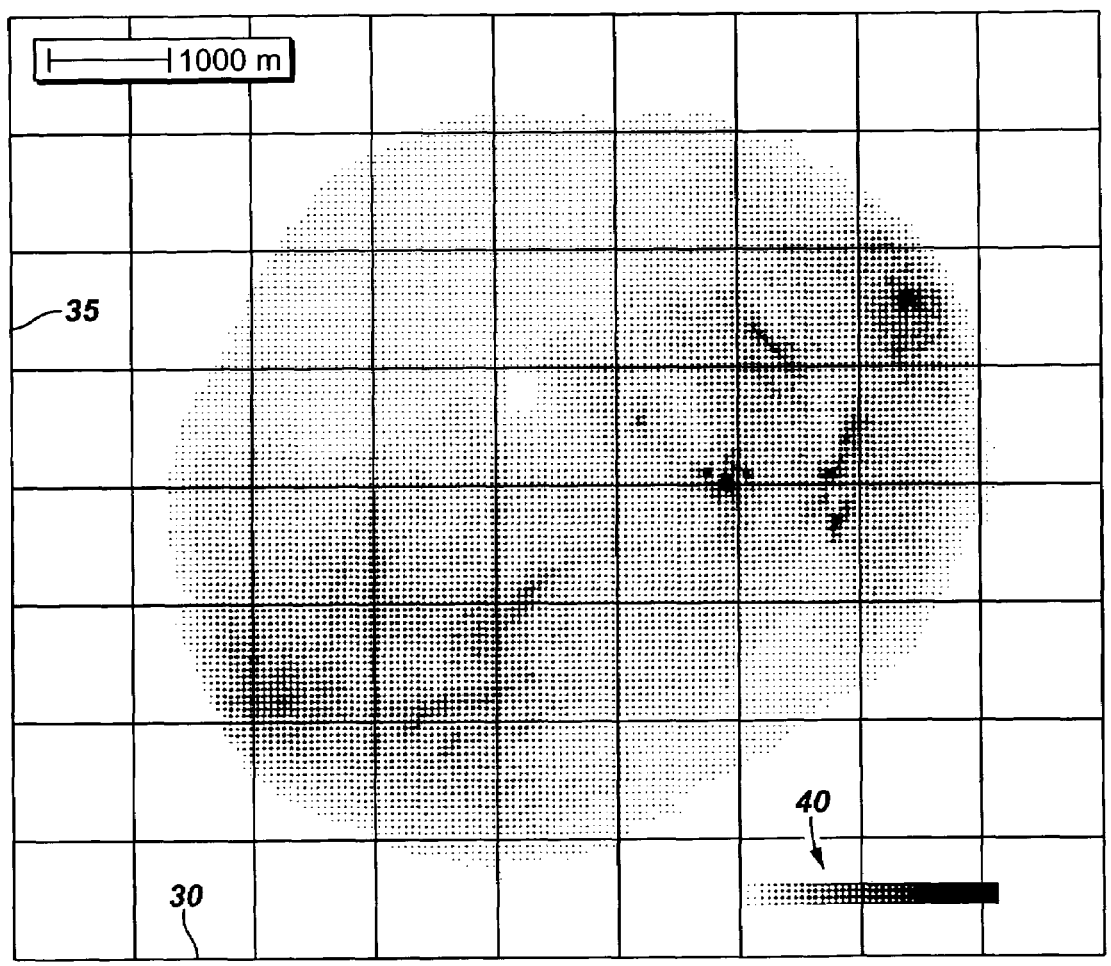
Figure 6:
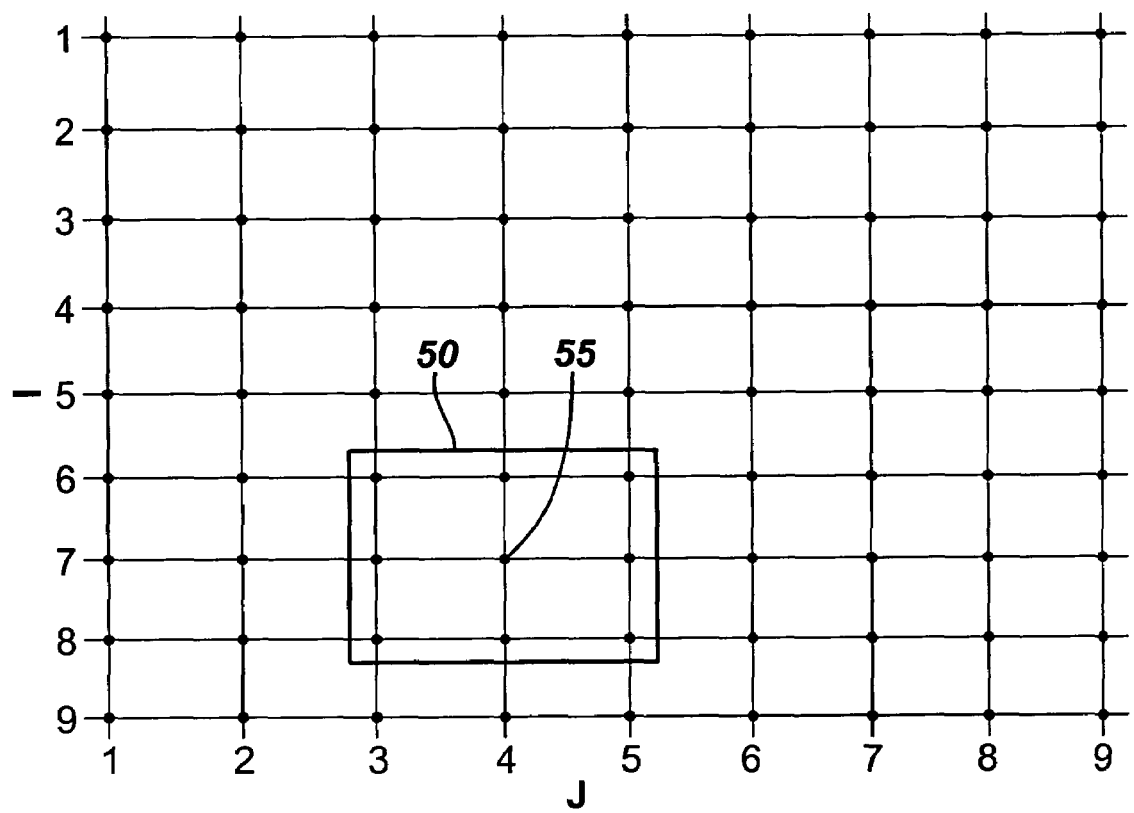

FIG. 5 shows a semblance plot generated from 20 shots each with 8 cables, each cable with 120 traces;

FIG. 6 shows local maxima picker; and

Figure 7:
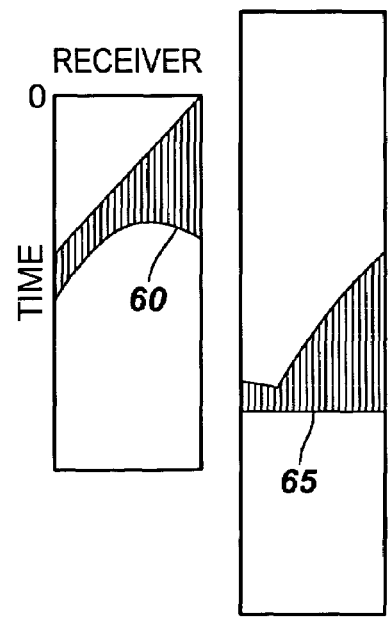

FIG. 7 shows flattening a diffractor.

DETAILED DESCRIPTION OF THE PREFERRED EMBODIMENTS

Figure 1:
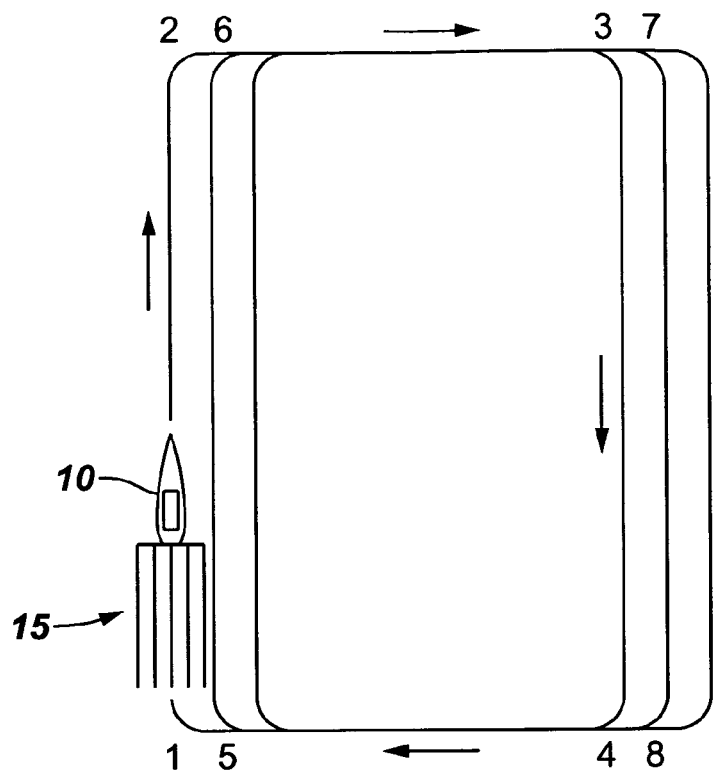
FIG. 1 shows boat sail-line patterns on a typical 3-D marine survey.

In seismic prospecting for oil and gas, a boat 10 pulls a set of receivers 15 (($x_r,y_r$) positions) placed on structures referred as "streamers" or "cables". The boat 10 has airguns (not shown but well known in the art) placed near it and these guns fire at certain intervals (($x_s,y_s$) positions) creating a seismic disturbance that travels into layers of earth and is reflected from each layer and received by these receivers. Reflections generally come from vertical slices of earth, which are called "subsurface lines" or "common midpoint lines," formed by the geometry of the recording. There are as many subsurface lines as there are cables. The boat 10 generally travels on a straight line to cover an area of interest and then turns back and places itself on the same course but with some lateral shift to produce more subsurface lines as shown in FIG. 1. Surface lines may overlap. It is imperative that what is recorded represents reflections from strata, but there are many noise types recorded. Among them is the scattered energy from inhomogeneities at sea bottom or materials that are at the sea bottom as wells, wellheads, sunken ships, etc. The scattered energy from the inhomogeneities are what the present invention seeks to eliminate.

A 3-D marine survey is generally recorded with patterns depicted in FIG. 1. A boat 10 pulling a number of streamers 15 starts from a point, like point 1, and travels to point 2. Direction from Point 1 to Point 2 could be any azimuth, i.e. not necessarily a south to north line. The boat turns at point 2 and travels until point 3 and makes another turn at point 3. It then travels to point 4 and makes another turn. It travels to point 5 and then makes another turn, and so on. Therefore, slightly shifting rectangles defined by points (1,2,3,4), (5,6,7,8), and so forth, are formed.

In the present invention, the initial step in locating the diffractors is to determine the minimum x value, maximum x value, minimum y value, and maximum y value of the receiver coordinates for the whole survey, as shown in FIG. 1. This is done by looking at the trace headers on the data. (A source receiver pair is called a trace.) These values are called: $X'_{min}$, $X'_{max}$, $Y'_{min}$, $Y'_{max}$, respectively. These values are then extended by an amount that a seismic wave can travel at the water velocity in the recording time. These new minimum and maximum values are called: $X_{min}$, $X_{max}$, $Y_{min}$, and $Y_{max}$, respectively. Then, $$X_{min}=X'_{min}-VT$$

$$X_{max}=X'_{max}+VT$$

$$Y_{min}=Y'_{min}-VT$$

$$Y_{max}=Y'_{max}+VT$$

where V is the medium (water) velocity and T is the recording time.

X and Y grid sizes, dx and dy respectively, are chosen to scan this area. Grid size (scan increment) used is typically 25 m both in x and y. Practice shows that any scan increments lower than 25 m and scan increments as high as 100 m can be used. However, the finer the scan increment, the more accurate the location determination for the diffractors. Of course, the run time is the more expensive. Sampling coarser than 100 m is not expected to yield accurate travel times for flattening the data for purpose of noise attenuation.

Then, for each point ($x_d,y_d$) on the grid defined by:

$$x_d=X_{min}+(i-1)*dx \ (i=1,2,\ldots,i_{max})$$

$$y_d=Y_{min}+(j-1)*dy \ (j=1,2,\ldots,j_{max})$$

where $$i_{max}=1+(X_{max}-X_{min})/dx$$

$$j_{max}=1+(Y_{max}-Y_{min})/dy$$

a coherency value is calculated using amplitudes, an, picked at the travel time (using Eq. 2) from some (or all) of the source-receiver pairs (($x_s,y_s$) and ($x_r,y_r$) pairs) for which travel times are in the recorded range (i.e. scattered energy from diffractors far away will not reach a given receiver if its arrival time is greater than recording time.)

There are many coherency measures available in the prior art. As discussed in the background and summary of the invention, it is possible to use stack amplitudes, stack power, energy normalized cross-correlation sum, or semblance. This invention uses the conventional semblance defined by $$s = \frac{\left(\sum_{n=1}^{N} a_n\right)^2}{N \sum_{n=1}^{N} a_n^2}$$ EQ. 1

Semblance Calculation from a Single Time Sample per Trace

If selectivity is desired, one can use functions of semblance as discussed by Gulunay, (1991). Some of the useful functions are:

$$s^n \quad n > 1$$

$$\frac{s}{1-s}$$

$$\log\left(\frac{1}{1-s}\right)$$

This invention preferably uses semblance (Eq. 1 or its smoothed version to be given in Eq. 4). Once such a semblance distribution is obtained, $$S(i,j) \ (i=1,2,\ldots,i_{max}, j=1,2,\ldots,i_{max})$$

then local maxima in this function can be found by requiring a point to be larger than all of the points in its neighborhood, (e.g. in a 100 m by 100 m part of the grid). Among all such points, the ones with significant values can be selected as valid diffractors.

Figure 2:
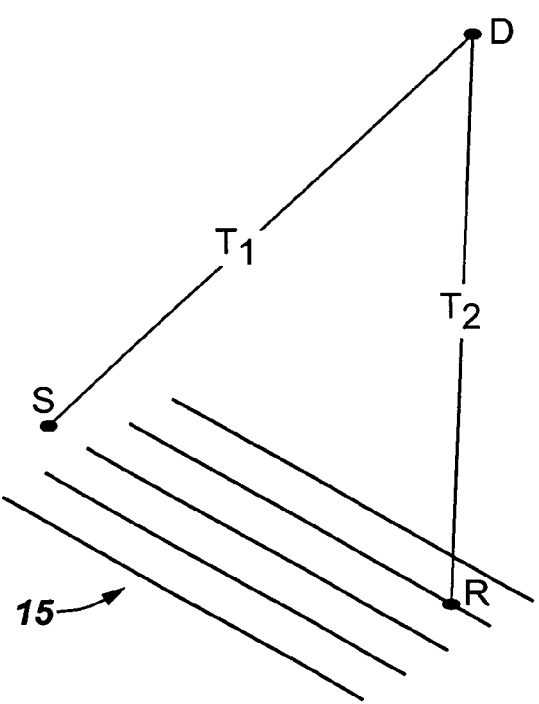
FIG. 2 shows source-diffractor-receiver travel path.

FIG. 2 depicts a source (point S) pulling some streamers 15 (cables) with typically hundreds (even thousands) of receivers (point R) placed on them. As source radiates energy travels to diffractor point D and is scattered back. Scattered energy radiates backs and sweeps all of the receivers (points like R) on the streamers 15.

Arrival time of diffracted energy is the sum of two terms: source term, $T_1$, and receiver term $T_2$, as shown in FIG. 2. As source ($x_s, y_s$) and receiver ($x_r, y_r$) coordinates are known, the value of arrival time from an assumed diffractor location ($x_d, y_d$) can be calculated using a medium velocity, V, like 1500 m/s. The equation for this calculation is given in Eq. 2.

$$T = T_1 + T_2 \quad \text{EQ. 2}$$

$$= \frac{1}{V}\left(\sqrt{(x_s - x_d)^2 + (y_s - y_d)^2 + z_d^2} + \sqrt{(x_r - x_d)^2 + (y_r - y_d)^2 + z_d^2}\right)$$

Travel Time Equation for Source-Diffractor-Receiver Travel Path

Here $Z_d$ represents the relative (with respect to the source and receivers) depth of the diffractor which is assumed to be zero in general but one can scan for a range of depths as well, if desired.

Indeed, if stacking amplitude $$s = \sum_{n=1}^{N} a_n \quad \text{EQ. 3}$$

Stack Amplitude as an Attribute rather than semblance values (defined in Eq. 1) are calculated, this invention will produce pre-stack migration, done for a small range of depths, and with velocity, V (medium velocity). Therefore, using such stack amplitudes for picking the location of diffractors in half space ($x_d, y_d, z_d$) is also a new approach.

Figure 3:
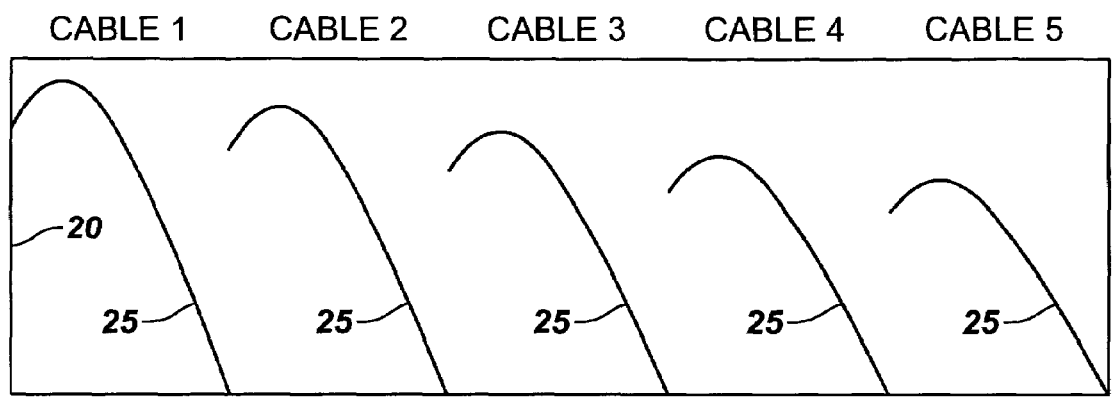
FIG. 3 shows arrival times of diffractions that are received from a diffractor by a boat carrying five cables.

To illustrate the method, note that arrival times form hyperbolic looking events 25 as depicted in FIG. 3 (for a small set of (five) cables). Each vertical line 20 in FIG. 3 depicts a trace (source-receiver pair) recorded by receiver on a cable during a particular 3-D shot. The wavelets on the traces depict the diffracted energy. The amplitude value, an (n=1, 2, . . . , N where N is the number of traces that diffractor contaminated) at the arrival time calculated by Eq. 2 for each source-receiver pair that can record energy from this diffractor with the recording time available on the seismic traces can be picked and put into semblance calculation given by Eq. 1.

When the travel time falls between the two time samples of the digitally recorded seismic trace then the value of sample, an is interpolated from the nearby samples with known techniques of the prior art.

To increase the reliability (smoothness) of semblance values, as it is known in prior art, it is possible to use more than one time sample (centered at the arrival time) for a trace to improve the reliability of the semblance calculation. If M time samples, instead of a single one, are picked, then there is a matrix of numbers ($A_{m,n}$) to use in the semblance $$\begin{pmatrix} a_{1,1}, a_{1,2}, \ldots, a_{1,N} \\ a_{2,1}, a_{2,2}, \ldots, a_{2,N} \\ \ldots \\ a_{M,1}, a_{M,2}, \ldots, a_{M,N} \end{pmatrix}$$

where rows, m=1, 2, . . . , M, represent time and columns, n=1, 2, . . . , N, represent space (traces).

Semblance calculations, as it is known in prior art, are made using Eq. 4:

$$s = \frac{\sum_{m=1}^{M}\left(\sum_{n=1}^{N} a_{m,n}\right)^2}{N \sum_{m=1}^{M} \sum_{n=1}^{N} a_{m,n}^2} \quad \text{EQ. 4}$$

Semblance Calculation from M Samples per Trace (Samples Centered at the Arrival Time)

The value of M can be arbitrary. However, practice shows that large values of M are not helpful. Lower values of M are preferable to increase both peak semblance values and resolution in time, which is equivalent in resolution in location (resolution in source to diffractor, diffractor to receiver distance means resolution in diffractor distance). A value of M about the size of the main peak of the diffracted arrival wavelet is best.

It is mentioned above that N in Eq. 1 is the number of traces that a diffractor has contaminated. There could be many such traces, coming from many sources and many streamers. There is not an increased benefit in using all these of contributions in one semblance calculation, as there are issues in mixing amplitudes from different shots and cables. For example, noise content differences would be one such obstacle. It was found that using only traces from one shot and one cable at a time tends to work the best. As there are many cables (c=1, 2, ..., $N_c$) and many shots (p=1, 2, ..., $N_p$), the results of multiple scans at one point (i,j) need to be accumulated $$s(i, j) = \sum_{p=1}^{Np} \sum_{c=1}^{Nc} s_{p,c}(i, j) \qquad \text{EQ. 5}$$

Semblance Accumulation from Many Cables and Shots

One needs to keep track of the number of values summed for each position (i,j), known sometimes as "fold," so that the results could be divided by its maximum to achieve physically meaningful semblance values (between 0 and 1). This is known as "normalization". It is also possible to use the fold value at each location to do the normalization (i.e. division by Np*Nc), but that might enhance the value of a low fold semblance and hence cause an unreliable semblance value to be considered as a diffractor location. It was found that the maximum fold is a better value to use for the normalization.

Figure 4:
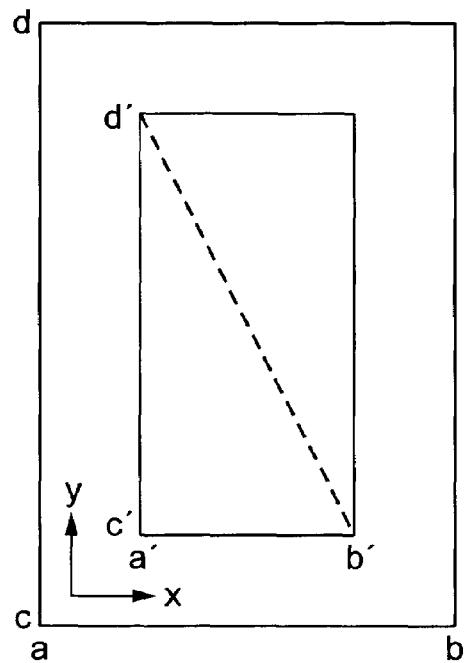
FIG. 4 shows scan range for a given cable.

For determination of the diffractor azimuth and individual scan values,
1) For cables that are not far from the shot, as in current 3-D marine recordings, one cable alone cannot tell the azimuth of the diffractor. That is, a diffractor shows itself at two points that are symmetrically oriented with respect to the line formed by the cable, one being the correct image, the other one incorrect. Adding the results of the scans from multiple cables suppresses the incorrect image and enhances the correct one.
2) When calculating individual scan values $s_{pc}$(ij), it saves computer time if one does not attempt to calculate this value for all grid points. That is, only those points that are within VT neighborhood of the receivers on the cable (see FIG. 4) need to be considered. If a' and b' are minimum and maximum found on the receiver x coordinates then considering diffractors with x coordinates that are in the range [a,b] where a=a'−VT and b=b'+VT is sufficient. Similarly, if c' and d' are minimum and maximum found on the receiver y coordinates, then considering diffractors with y coordinates that are in range [c,d] where c=c'−VT and d=d'+VT is sufficient. Here V represents medium velocity and T represents the recording time as before.

FIG. 5 shows the results of semblance scan obtained from 20 shots ($N_p$=20) each pulling 8 cables ($N_c$=8). Horizontal axis 30 is the x-coordinate and vertical axis 35 is the y-coordinate. The x-coordinate 30 increases towards the right, facing the figures and y-coordinate increases towards the top of the FIG. 5. The scan increment used here is preferably 10 m in both x and y directions. Practice shows that scan increments as low as 5 m and as high as 100 m can be used. The finer the scan increment, more accurate the location of the local maxima. Sampling coarser than 100 m is not preferred and is not expected to yield accurate travel times for flattening the data for purpose of noise attenuation. The color code 40 is shown at the lower right corner of FIG. 5. Semblance values vary between zero and one. Peak semblance value for this run was 0.239. Semblance values above 0.100 are clipped in the Figure.

FIG. 5 provides a visual display of the diffractor locations. It covers an area of roughly 40 km². Actual locations are machine picked by requiring that a local maxima point needs to be the biggest amplitude in a space (x,y) window, typically and preferably specified as 100 m by 100 m. More explicitly, a user given window size in distance units (like meters) for local maxima determination is first converted to a window size in grid points, each side being an odd number (1, 3, 5, ... ). If window size is 2m+1 by 2n+1 (where m and n are positive integers), then each point, (ij) on the grid is checked to determine if it is the largest amplitude in 2 m+1 and 2n+1 neighborhood:

$$a_{i,j} \geq a_{i-u,j-v} \quad \text{for} \quad -m \leq u \leq +m \quad \text{and} \quad -n \leq v \leq +n \qquad \text{EQ. 6}$$

Local Maxima Checker Definition where u and v are integers except u=v=o. All i and j locations, except the edges, i.e. all the points satisfying $$m+1 \leq i \leq i_{max}-m \text{ and } n+1 \leq j \leq j_{max}-n$$

are checked and (i,j) points satisfying Eq. 6 are taken as possible diffractor locations. Order in which one varies i and j depends on how the values are stored in the computer; preferably one first scans row indices on column 1 (i=1,$i_{max}$), then column 2, then column 3, etc.

FIG. 6 illustrates local maxima search window 50 for a 3-by-3 window for simplicity. For a center point 55 to be chosen as a local maxima, it must be greater than its eight neighbors 55 in FIG. 6. For a 5-by-5 window the middle point must be greater than its 24 neighbors. For a (2m+1)-by-(2n+1) window the amplitude of the middle point must be greater than the amplitudes of its (2m+1)(2n+1)−1 neighbors.

Once a set of such diffractor locations are found, one can use methods known in prior art to flatten and reject diffracted energy for each location. Flattening is a process (depicted in FIG. 7) where diffracted event's travel times 60 are subtracted 65 from the trace. This is known in prior art as "static shift". During this static shift, care must be taken not to lose data by extending (doubling) trace length and putting data at the bottom before static shifting upwards (otherwise data above diffraction will be lost).

There are numerous tools in geophysical industry to remove events contaminating the data. Among them are FK filter, regular and high-resolution radon filter, eigenimage filter, etc. Any of these could be used to suppress such diffracted energy. Flattening and flat event suppression is done for every diffractor found in the survey.

Because many varying and different embodiments may be made within the scope of the invention concept taught herein which may involve many modifications in the embodiments herein detailed in accordance with the descriptive requirements of the law, it is to be understood that the details herein are to be interpreted as illustrative and not in a limiting sense.

The invention claimed is:
1. A computer implemented method of determination of diffractor location utilizing traces of a recorded 3-D marine survey with one or more cables, comprising the steps of:
   A. Selecting coordinate boundary;
   B. Calculating lateral coherency values, wherein the coherency value is calculated using amplitudes of traces at calculated travel times; and
   C. Determining diffractor location in the coordinate boundary area using the coherency values;
   wherein the determining of the actual locations of the diffractors is determined by requiring that a local maxima point on a coherency plot be the largest amplitude in a space (x, y) window;

wherein there is included the step of taking all points which satisfy the following equation as possible diffractor locations, the equation being:

$a_{i,j} \geq a_{i-u,j-v}$ for $-m \leq u \leq +m$ and $-n \leq v \leq +n$ where u and v are non-zero integers and $a_{m,n}$ are amplitudes.

* * * * *